US010354107B2

(12) United States Patent
DiVirgilio et al.

(10) Patent No.: US 10,354,107 B2
(45) Date of Patent: Jul. 16, 2019

(54) SWITCH FOR SWITCHING BETWEEN HANDS-FREE AND HANDHELD MODES OF OPERATION IN AN IMAGING READER

(71) Applicant: SYMBOL TECHNOLOGIES, LLC, Lincolnshire, IL (US)

(72) Inventors: Joseph J. DiVirgilio, Port Jefferson Station, NY (US); Darran Michael Handshaw, Sound Beach, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/812,176

(22) Filed: Nov. 14, 2017

(65) Prior Publication Data

US 2019/0147207 A1 May 16, 2019

(51) Int. Cl.
*G06K 7/10* (2006.01)

(52) U.S. Cl.
CPC ..... *G06K 7/10732* (2013.01); *G06K 7/10881* (2013.01)

(58) Field of Classification Search
CPC .. G06K 7/0004; G06K 7/10881; G06K 7/109; G06K 9/228; G06K 7/10; G06K 7/10851; G06K 7/10732; G06K 7/10722; G06K 7/10712; G06K 7/10831; G06K 7/10683; G06K 7/10801; G06K 7/10554; G06K 7/14; G06K 2207/1012
See application file for complete search history.

(56) References Cited

U.S. PATENT DOCUMENTS

2002/0185536 A1* 12/2002 Tsunobuchi ............. G06K 7/10 235/454
2008/0179405 A1* 7/2008 Benderly ......... G06K 19/06046 235/494
2008/0197198 A1* 8/2008 Barkan .............. G06K 7/10702 235/462.36
2009/0039161 A1* 2/2009 Matsushima ...... G06K 7/10712 235/454
2009/0108076 A1* 4/2009 Barkan ................ G06K 7/0004 235/462.48
2009/0273449 A1* 11/2009 Tuttle ................. G06K 7/10346 340/10.4
2010/0060420 A1* 3/2010 Stagg ................. G06K 7/10217 340/10.1
2010/0066275 A1* 3/2010 Giebel ............... G06K 7/10643 318/128
2011/0290889 A1* 12/2011 Tamburrini ........ G06K 7/10881 235/470

* cited by examiner

*Primary Examiner* — Thien T Mai
(74) *Attorney, Agent, or Firm* — Yuri Astvatsaturov

(57) ABSTRACT

A method and apparatus for switching an optical imaging reader between a hands-free mode and a handheld mode using a grip-enabling switch, which is actuated by a user's grip on the handle of the reader in order to switch from the hands-free mode to the handheld mode, and which switches from the handheld mode to the hands-free mode if the grip-enabling switch is no longer actuated.

21 Claims, 7 Drawing Sheets

102
111
112
114
116
104

SWITCH FOR SWITCHING BETWEEN HANDS-FREE AND HANDHELD MODES OF OPERATION IN AN IMAGING READER

BACKGROUND OF THE INVENTION

Imaging readers, such as barcode scanners, can switch between hands-free and handheld modes of operation. Typically, a spring-based switch in a base of the imaging reader detected if the imaging reader was set down on a surface or cradle (hands-free), or removed from the surface or cradle (handheld). This required electronics to be placed in the base of the imaging scanner, making it susceptible to liquid spills and dirt which interfered with the switch and/or other electronics. In addition, a flexible connection between the base and the handle, in which the handle pivots with respect to the base, may cause reliability issues and complications during manufacturing and susceptible to mechanical failure in the field, because of the electronics in the base and the connections between the electronics in the base and electronics in the handle, usually using flexible interconnects.

Accordingly, there is a need for system and method for improved switching between hands-free and handheld modes of operation in an imaging reader.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
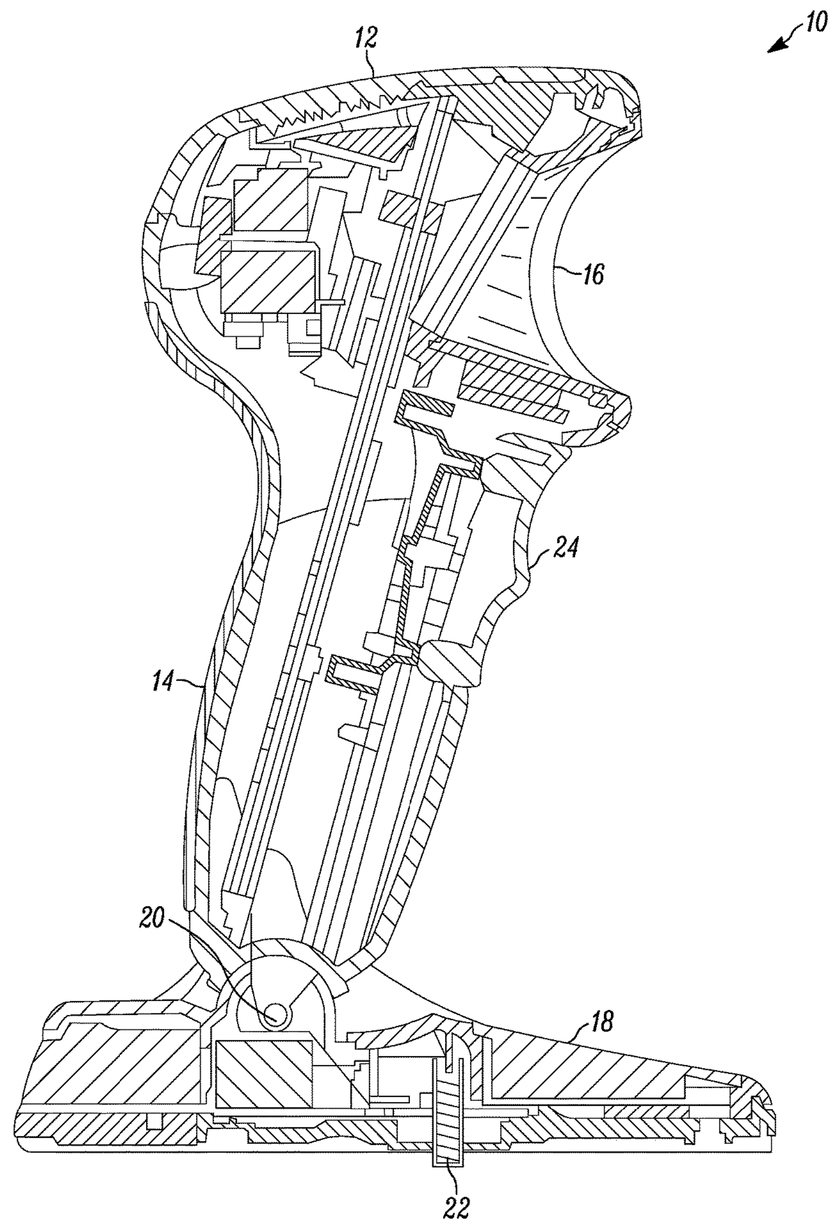
FIG. 1 is a cross-sectional side view of a prior art optical imaging reader.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure provides an apparatus that includes a housing, an imaging engine, a grip-enabling switch and a controller. The housing has a window and a manually-actuatable switch. The imaging engine is operable in a first state and in a second state. The imaging engine is supported by the housing and includes a light-detecting sensor with a field of view extending through the window. The light-detecting sensor is adapted to capture either light reflected from a target and/or light emitted from the target. The grip-enabling switch is supported by the housing. The controller is operatively coupled to the grip-enabling switch and the imaging engine. The controller is adapted to enable the imaging engine to operate in a first state without manually actuating the manually-actuatable switch. The controller is further adapted to enable the imaging engine to operate in a second state by manually actuating the manually-actuatable switch. The controller is still further adapted to switch the imaging engine from the first state to the second state in response to actuation of the grip-enabling switch.

Another aspect of the present disclosure provides an apparatus that includes a housing, an imaging engine, a grip-enabling switch and a controller. The housing has a scanning head with a window, a handle, and a manually-actuatable switch supported by the handle. The imaging engine is supported by the scanning head and includes a light-detecting sensor with a field of view extending through the window. The light-detecting sensor is adapted to capture at least one of: light reflected from a target and light emitted from the target. The grip-enabling switch is supported by the handle. The controller is operatively supported by the handle and operatively coupled to the manually-actuatable switch, the grip-enabling switch, and the imaging engine. The controller is adapted to switch the imaging engine from a first mode to a second mode in response to actuation of the grip-enabling switch.

FIG. 1 is a cross sectional side view of a prior art optical imaging reader 10. The prior art imaging reader 10 has a scanning head or body 12, a lower handle 14, and a window 16 located adjacent a front of the body 12. The prior art reader 10 is connected to a base 18 via a pivot mechanism 20, where the base 18 rests on a support surface, such as a countertop or tabletop. In the illustrated embodiment, the prior art reader 10 is cordless, in which case the prior art reader 10 may have a battery to deliver electrical power and a wireless communication interface to facilitate bi-directional communications with a remote host (not shown). In other embodiments, a cable is connected to the base 18 to deliver electrical power to the prior art reader 10 and to support bidirectional communications between the prior art reader 10 and a remote host. In still other embodiments, the base 18 may be a stand or presentation cradle that rests on the surface, and the prior art reader 10 may likewise be cordless and removable from the stand, with a battery to deliver electrical power and a wireless communication interface. A cable may be connected to the stand to deliver electrical power to the prior art reader 10 and recharge the battery when the prior art reader 10 is placed in the stand.

As further illustrated in FIG. 1, a pickup-enabling switch 22 is mounted on the reader 10 at the bottom of the base 18. The pickup-enabling switch 22 is operative for detecting the handheld mode of operation in which the user holds the prior art reader 10 away from the surface, and manually activates a switch or trigger 24 during image capture, and for detecting the hands-free mode of operation in which the user does not hold the prior art reader 10 and does not manually activate the trigger 24 during image capture. The prior art reader 10 automatically switches from the triggerless, hands-free mode to the triggered, handheld mode when the prior art reader 10 is picked up from the surface thereby actuating the pickup-enabling switch 22, regardless of how the prior art reader 10 may be gripped by the user. For example, the pickup-enabling switch 22 may be a button switch that includes an optical encoder with a biased extension that blocks a thru-beam sensor (e.g., optical receiver/transmitter pair) when the prior art reader 10 is set on the surface, in which case the thru-beam sensor sends a signal to a controller of the prior art reader 10 indicating a triggerless, hands-free mode. When the prior art reader 10 is picked up from the surface, the extension moves into an unbiased state extending downward and away from the base 18, as shown in FIG. 1, in which case the signal is unblocked and the thru-beam sensor sends a signal to the controller indicating a triggered, handheld mode.

Figure 2:
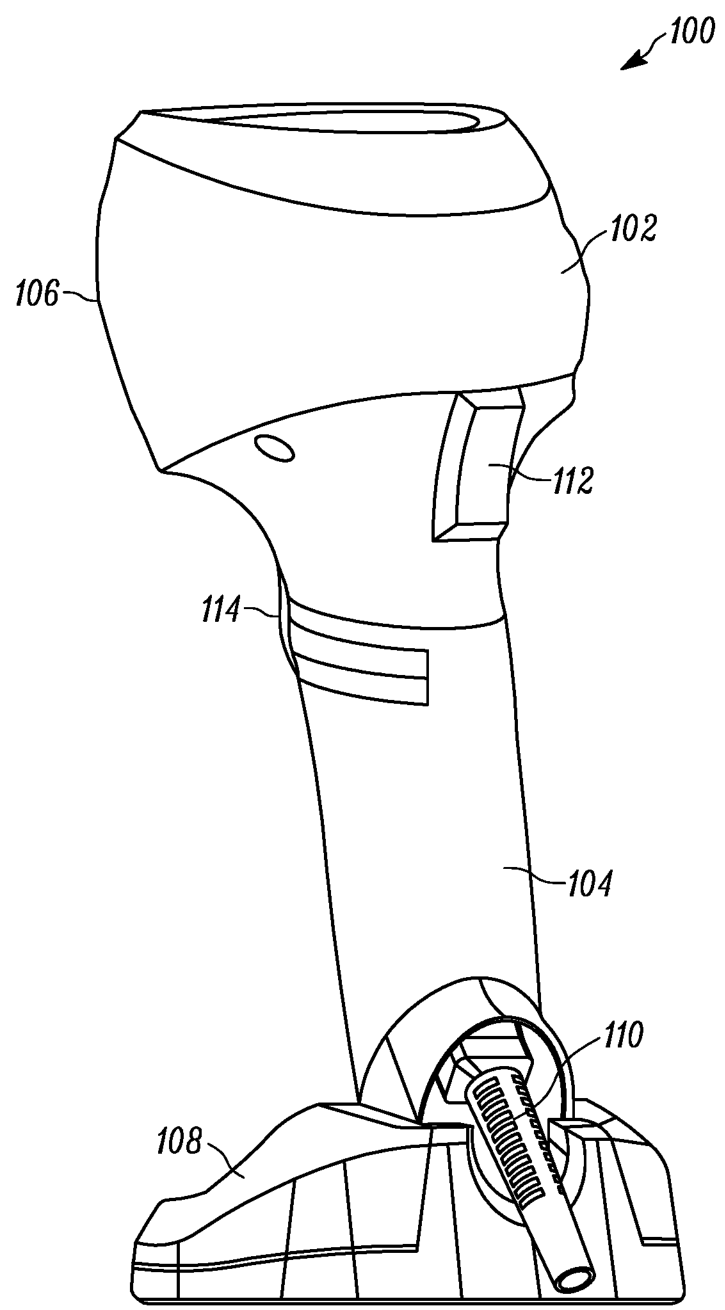
FIG. 2 is a perspective back and side view of an optical imaging reader in accordance with some embodiments.
Figure 3:
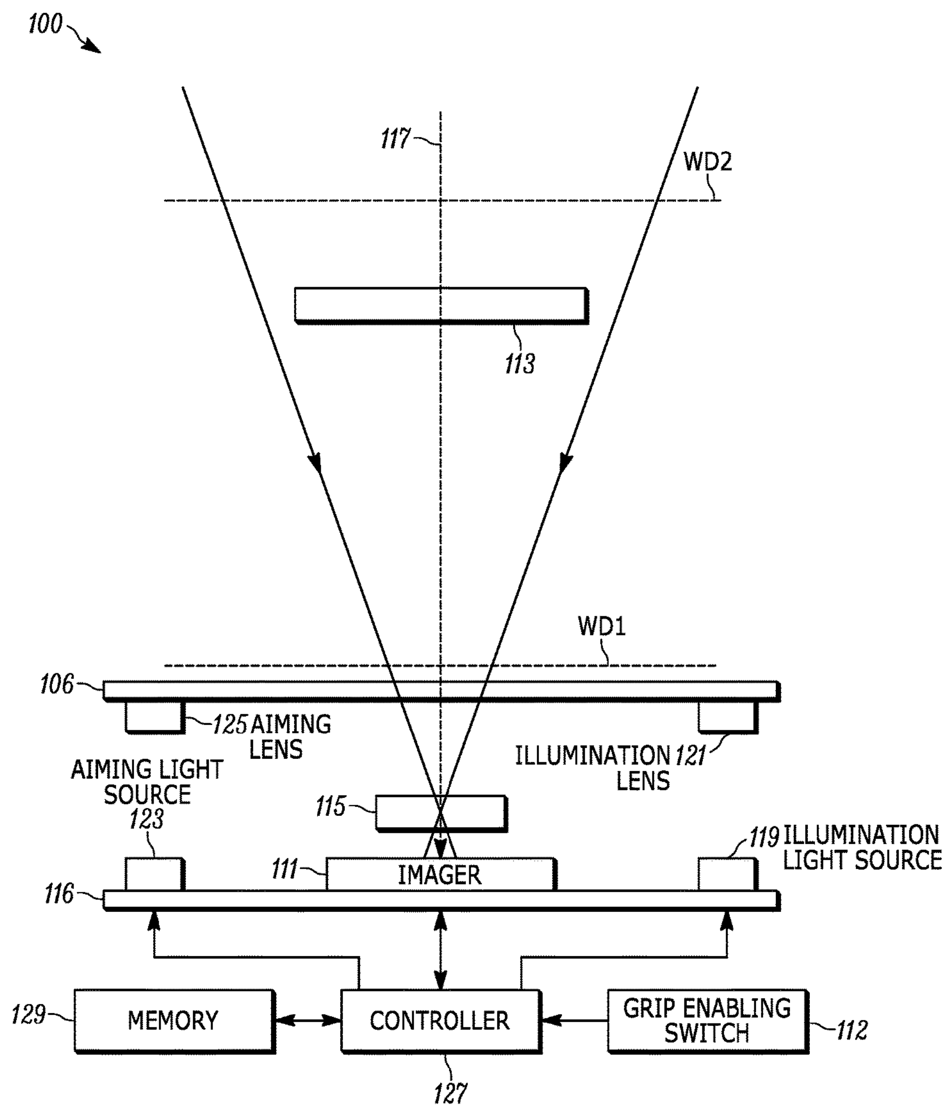
FIG. 3 is a schematic of various components of the reader of FIG. 2.

FIGS. 2 and 3 are exemplary embodiments of an improved optical imaging reader 100 and the components thereof. FIG. 2 is a perspective, back and side view of an embodiment of an optical imaging reader 100. Generally speaking, the imaging reader has a scanning head or body 102 and a lower handle 104, and a window 106 located adjacent a front of the body 102. In one example, the reader 100 is ergonomically configured for a user's hand as a gun-shaped housing, though other configurations may be utilized as understood by those of ordinary skill in the art. In a further example, the lower handle 104 extends below and rearwardly away from the body 102.

In the embodiment of FIG. 2, the reader 100 is connected to a base 108 that rests on a support surface, such as a countertop or tabletop. In the shown embodiment, a cable 110 is connected to the base 108 to deliver electrical power to the reader 100 and to support bidirectional communications between the reader 100 and a remote host (not illustrated). However, in other embodiments, the reader 100 may be cordless and removable from a stand or presentation cradle that rests on the surface, in which case the reader 100 may have a battery to deliver electrical power and a wireless communication interface to facilitate bi-directional communications. In a further embodiment, a cable is connected to the stand to deliver electrical power to the reader 100 and recharge the battery when the reader 100 is placed in the stand. In still another embodiments, the reader 100 is connected to the base 108, but is cordless, and may have a battery to deliver electrical power and a wireless communication interface to facilitate bi-directional communications.

As further illustrated in FIG. 2, a grip-enabling switch 112 is mounted on the reader 100, preferably on the back of the handle 104 below the scanning head or body 102. Typically, this is where a user grips the reader 100 for a handheld mode, such that the purlicue of the user's hand engages the grip-enabling switch 112. In an embodiment, the grip-enabling switch 112 is disposed partially inside the housing and partially outside the housing when in an un-actuated, extended position, and may be substantially inside the housing and flush with the outside of the housing when in an actuated, compressed position.

The grip-enabling switch 112 is operative for detecting the handheld mode of operation in which the user holds the reader 100 and manually activates a switch or trigger 114 during image capture, and for detecting the hands-free mode of operation in which the user does not hold the reader 100 and does not manually activate the trigger 114 during image capture. A controller (discussed below) automatically switches from the triggerless, hands-free mode to the triggered, handheld mode when the grip-enabled switch detects that the user is gripping the reader 100 by the handle 104. The triggerless, hands-free mode is the default mode.

Referring to FIG. 3, an imaging engine includes a light-detecting sensor or imager 111 operatively coupled to, or mounted on, a printed circuit board (PCB) 116 in the reader 100. In an embodiment, the imager 111 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging lens assembly 115 over a field of view along an imaging axis 117 through the window 106 in either mode of operation. The return light is scattered and/or reflected from the target 113 over the field of view. The imaging lens assembly 115 is operative for focusing the return light onto the array of image sensors to enable the target 113 to be read. The target 113 may be located anywhere in a working range of distances between a close-in working distance (WD1) and a far-out working distance (WD2). In a preferred embodiment, WD1 is about one-half inch from the window 106, and WD2 is about thirty inches from the window 106.

An illuminating light assembly is also mounted in the imaging reader 100. The illuminating light assembly includes an illumination light source, such as at least one light emitting diode (LED) 119 and at least one illumination lens 121, and preferably a plurality of illumination LEDs and illumination lenses, configured to generate a substantially uniform distributed illumination pattern of illumination light on and along the target 113 to be read by image capture. At least part of the scattered and/or reflected return light is derived from the illumination pattern of light on and along the target 113.

An aiming light assembly is also mounted in the imaging reader 100 and preferably includes an aiming light source 123, e.g., one or more aiming LEDs, and an aiming lens 125 for generating and directing a visible aiming light beam away from the reader 100 onto the symbol 113 in the handheld mode. The aiming light beam has a cross-section with a pattern, for example, a generally circular spot or cross-hairs for placement at the center of the symbol 113 as shown in FIG. 4A, or a line for placement across the symbol 113, or a set of framing lines to bound the field of view, to assist an operator in visually locating the symbol 113 within the field of view prior to image capture.

As also shown in FIG. 3, the imager 111, the illumination LED 119, and the aiming LED 123 are operatively connected to a controller or programmed microprocessor 127 operative for controlling the operation of these components. A memory 129 is connected and accessible to the controller 127. Preferably, the microprocessor 127 is the same as the one used for processing the captured return light from the illuminated target 113 to obtain data related to the target 113.

The grip-enabling switch 112 is operative for detecting the handheld mode of operation in which the user holds the reader 100, and manually activates the switch or trigger 114 during image capture, and for detecting the hands-free mode of operation in which the user does not hold the reader 100 and does not manually activate the trigger 114 during image capture. The controller 127 automatically switches from the triggerless, hands-free mode to the triggered, handheld mode when the grip-enabling switch is actuated, thereby detecting that the user is holding the reader 100.

Figure 4A:
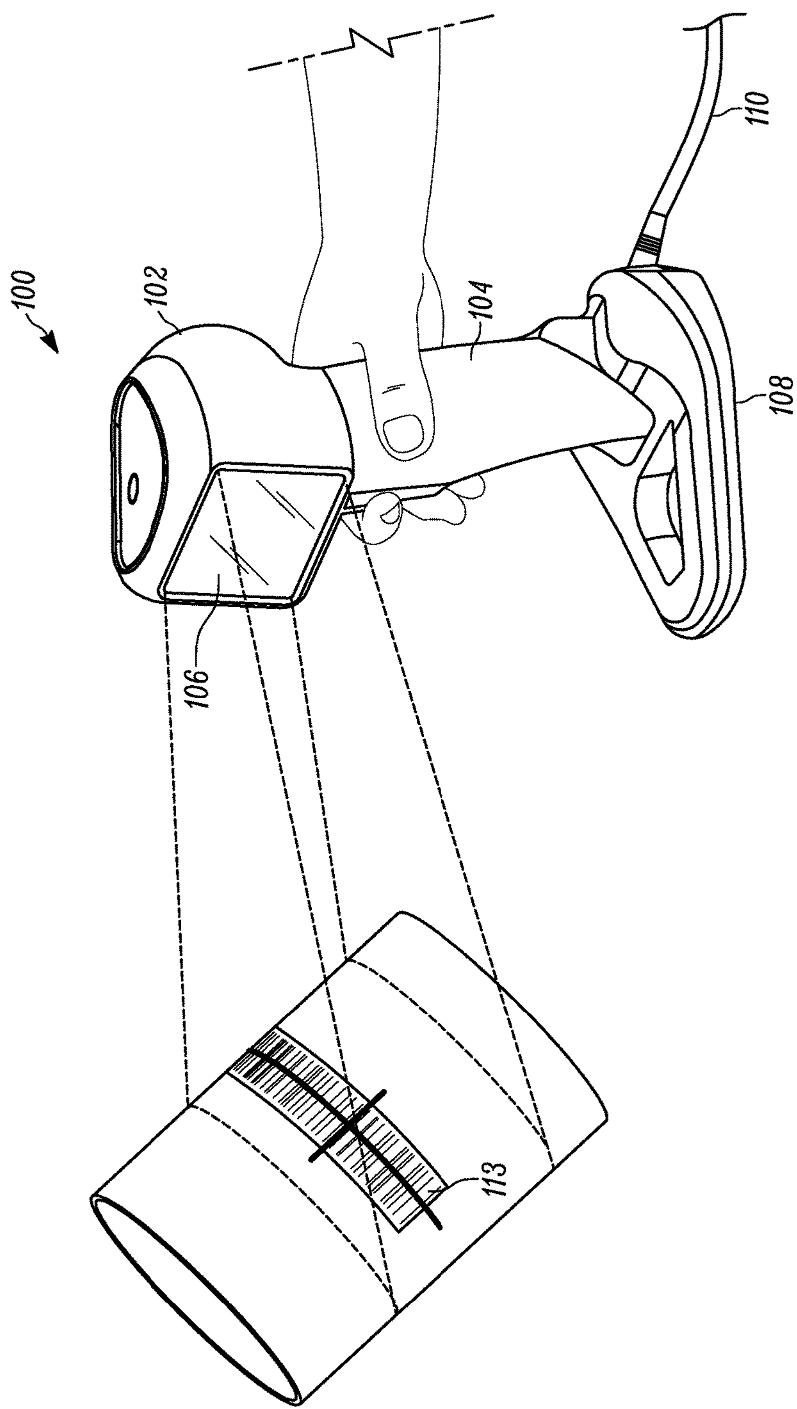
FIG. 4A is a perspective upper view of an optical imaging reader in a handheld mode in accordance with some embodiments.
Figure 4B:
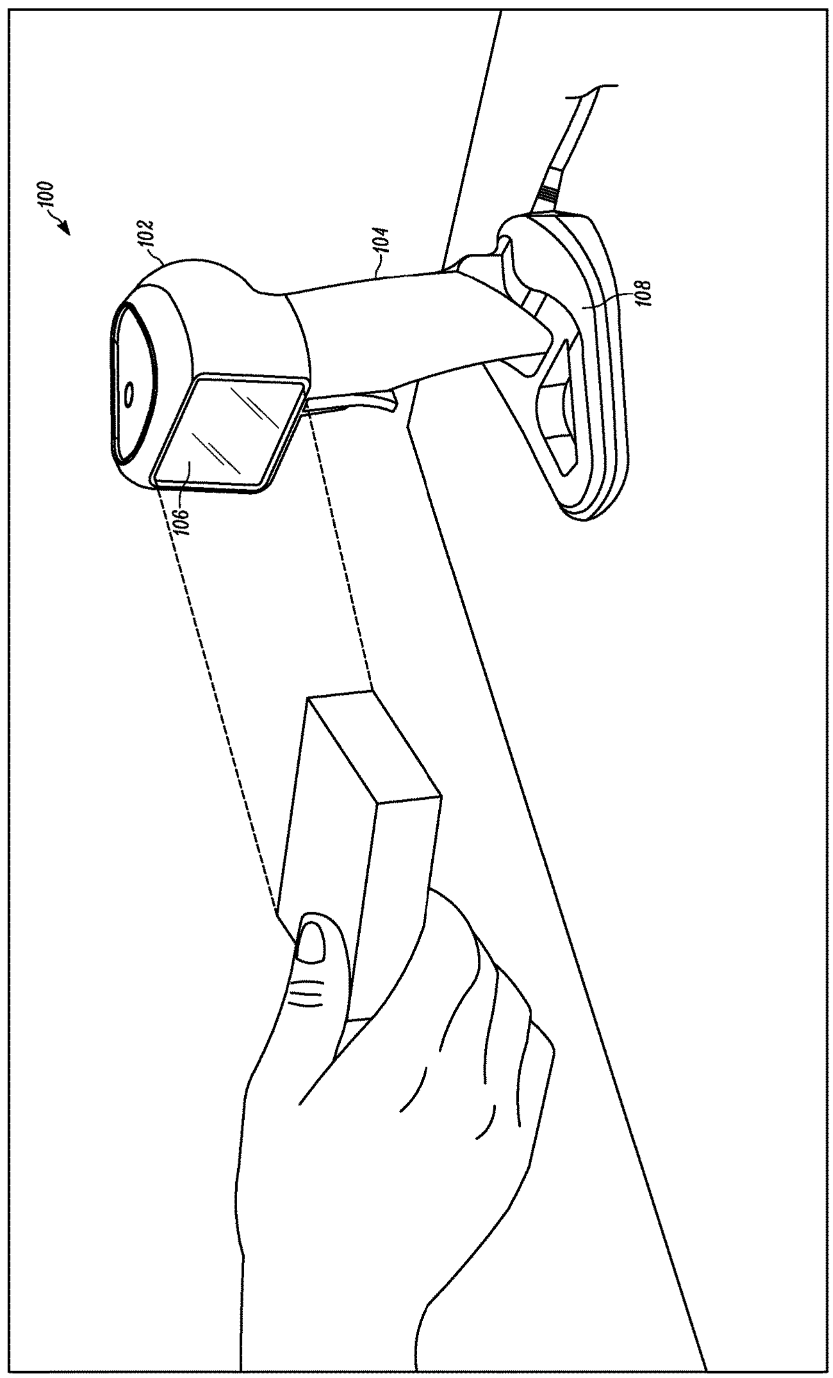
FIG. 4B is a perspective front view of an optical imaging reader in a hands-free (presentation) mode in accordance with some embodiments.

FIGS. 4A and 4B, respectively, are exemplary embodiments of a handheld and a hands-free modes of operation for the reader 100. As shown in FIG. 4A, the reader 100 of FIG. 2, together with its stand 108, are jointly lifted as a unit off the support surface, and held by the handle 104 in an operator's hand, and used in a handheld mode of operation, in which the trigger 114 is manually actuated and depressed to initiate reading of symbol/document targets 113, such as a barcode on a product, in a range of working distances relative to the window 106. In a presentation or hands-free mode of operation, the reader 100 of FIGS. 2 and 3, together with its base 108, is jointly mounted on the support surface, as shown in FIG. 4B, in which symbol/document targets are presented in a range of working distances relative to the window 106 for reading. The grip-enabling switch 112 may be strategically placed so as to be triggered when a user grips the handle 104 as shown in FIG. 4A. In one example, disclosed further below, the handle 104 has a proximal end which connects to the scanning head 102, and the grip-enabling switch 112 may be supported by the housing at the proximal end below the scanning head 102.

In a wireless embodiment, the stand 108 is a cradle that rests on the support surface, and the reader 100 is mounted in, or removed from, the cradle 108 depending on the mode of operation. In a handheld mode of operation, the reader 100 is removed and lifted from the cradle 108, and held by the handle 104 in an operator's hand, in which the trigger 114 is manually actuated and depressed to initiate reading of symbol/document targets in a range of working distances relative to the window 106. In a hands-free mode of operation, the reader 100 is detachably mounted, and preferably tilted/oriented forward, in the cradle 108 in which symbol/document targets are presented in a range of working distances relative to the window 106 for reading, similar to FIG. 4B. The cable 110 may be connected to the cradle 108 to support bidirectional communications between the reader 100 mounted in the cradle 108 and a remote host (not illustrated). Alternatively or in addition, the cable 110 includes power conductors for supplying electrical power to recharge a battery in the wireless reader 100.

Figure 5B:
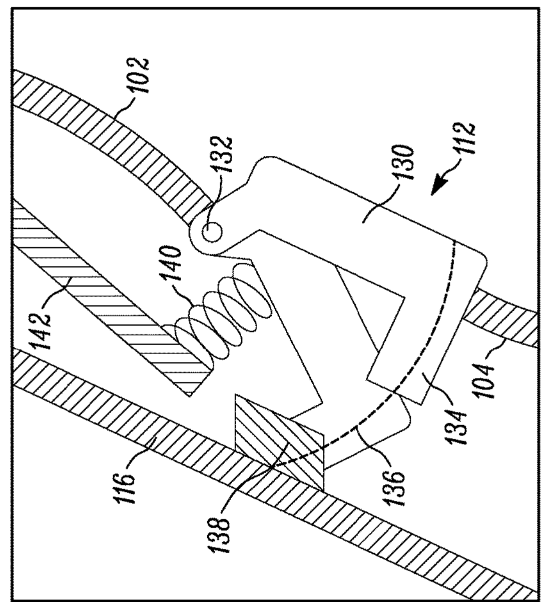
FIG. 5B is an enlarged cross-sectional view of a portion of the interior of a handle of the optical imaging reader in accordance with FIG. 5A.
Figure 5A:
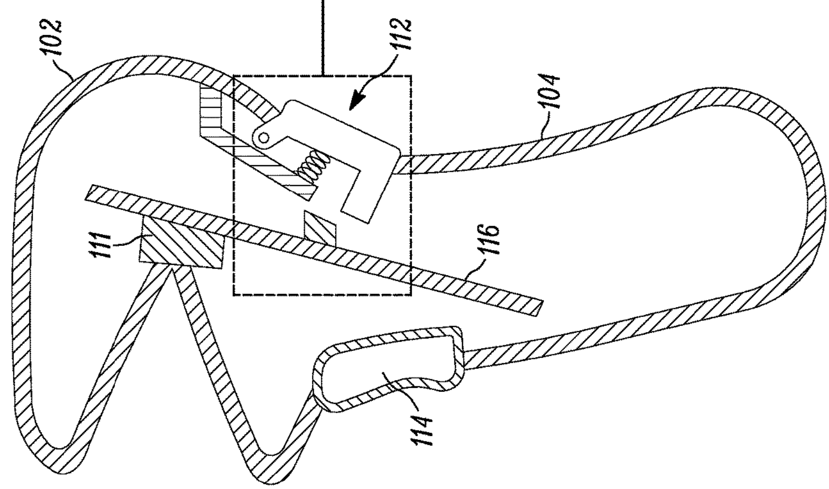
FIG. 5A is a cross-sectional side view of the interior of the optical imaging reader in accordance with some embodiments.

FIGS. 5A and 5B are cross-sectional views showing the interior of the scanning head 102 and handle 104 of the housing in an embodiment of the reader 100. Referring to FIG. 5A, the interior of the handle 104 houses, at least in part, the printed circuit board (PCB) 116, upon which may be mounted the imager 111 as it extends into the scanning head 102. At the very least, the PCB 116 is operatively coupled to the imager 111. Notably, in this embodiment the PCB 116 does not extend into a base 108, nor do any electronics extend into a base, as contrasted with prior readers that utilized a pickup-enabled switch at the bottom of the base to switch between hands-free and handheld modes. Thus, it will be understood by one of ordinary skill in the art that the grip-enabled switch is activated by a user gripping the reader 100, as opposed to picking up the reader 100, in that the reader 100 may be picked up without gripping the reader 100, and the reader 100 may be gripped without picking the reader 100 up.

As seen in FIG. 5A, the grip-enabling switch 112 is positioned on the anterior of the handle 104 opposite the trigger 114, such that the user's forefinger may be used to actuate the trigger 114 while at the same time actuating the grip-enabling switch 112. In an embodiment, which the applicant has deemed preferable, the grip-enabling switch 112 is a mechanical spring-based switch supported by, and extending through, the anterior side of the housing of the handle 104 opposite the trigger 114 in order for the purlicue of a user's hand to apply pressure to the grip-enabling switch 112, during which the reader 100 is in a handheld mode. However, it should be understood that the grip-enabling switch 112 may be positioned anywhere around the handle 104 along the same general circumference as the trigger 114, as it is generally the case that a user will grip the reader 100 in a manner that allows the user to actuate the trigger 114 with the forefinger. For example, the grip-enabling switch may be positioned to either side of the handle 104, so as to be actuated by a user's thumb while the user grips the handle 104, though it is understood that the side on which the grip-enabling switch is positioned on the handle 104 may not accommodate the natural grip of all users (e.g., positioned on the right may not accommodate a natural grip by left-handed users, and positioned on the left may not be accommodate a natural grip by right-handed users).

FIG. 5B depicts a cross-section of the interior of the housing and the grip-enabling switch 112 where the proximal end of the handle 104 meets the underside of the scanning head 102, and where a user generally grips the reader 100 (or at least grips with the thumb, forefinger and purlicue). In a preferred embodiment, the grip-enabling switch is an arm switch that includes a main body portion 130 pivotally attached to the housing at a pivot point 132 on the proximal end of the main body portion 130. A structural extension 134 orthogonal to the main body portion 130 may form the distal end of the grip-enabling trigger 12. As the main body portion 130 pivots on the pivot point 132 from an un-actuated, extended position to an actuated compressed position in response to a user's grip, the structural extension travels in a rotational motion along an arc 136 into the housing and actuates a sensor 138 mounted on the PCB 116. In an embodiment, the structural extension 134 or similar body portion is considered part of the main body portion 130.

In an embodiment, the sensor 138 is an optical thru-beam sensor. An optical thru-beam sensor includes an emitter/receiver pair, in which the emitter transmits a light beam at the receiver. When the grip-enabled trigger 112 is actuated, the structural extension 134 blocks the transmission, and the receiver sends a signal to the controller 127 to switch from the hands-free mode to the handheld mode. The optical thru-beam sensor is preferable as it requires virtually no force to trigger the sensor. However, it will be understood that different sensors may be utilized, including sensors with different transmitter/receiver pairs in which the structural extension 136 interrupts a transmission between the transmitter and the receiver. In other embodiments, the interruption between the transmitter/receiver pair may include allowing a signal to transmit from the transmitter to the receiver. In still other embodiments, the grip-enabled switch may be a button switch as opposed to an arm switch. In further embodiments, the grip-enabled switch 112 may utilize a magnet on the structural extension 134 to induce the sensor 138 to generate a signal to the controller 127 to switch between the hands-free mode and the handheld mode, including, for example, a reed switch.

A biasing mechanism, such as a spring 140, may be disposed between a portion 142 of the housing and the main body portion 130, so as to exert a biasing force against the main body portion 130, and/or a bi-directional biasing force against the main body portion 130 and the portion 142 of the housing. In general, the biasing force is nominal, and preferably just enough to bias against gravitational pull on the main body portion. In an embodiment, the spring bias 140 possesses a biasing force in the range of 100-200 grams. That is, a user must apply 100-200 grams of force to the grip-enabled switch 112 in order to overcome the biasing force of the spring bias 140 to pivot the main body portion 130 from the un-actuated, extended position to the actuated, compressed position. While the grip-enabling switch 130 is actuated, the controller 127 maintains the handheld mode, and when the grip-enabling switch 130 is released (un-actuated), the controller 127 reverts to the default hands-free mode.

In the hands-free mode of operation, the controller 127 may either be free-running and continuously or intermittently send a command signal to energize the illumination LED 119 for a short exposure time period, say 1080 microseconds or less, and energizes and exposes the imager 111 to collect the return light (e.g., illumination light, reflected light and/or ambient light) from the target 113 during said exposure time period. Alternatively, the imager 111 or an object sensor may be employed to detect entry of the target 113 into the field of view and, in response to such target entry detection, the controller 127 sends the aforementioned command signal. In the hands-free mode, the imaging engine is constantly attempting to read any target 113 placed within its field of view, and the illuminating light assembly 119, 121 is constantly being energized to illuminate any such target 113, and the controller 127 is constantly attempting to decode any such illuminated target 113.

Several characteristics of the imaging engine differ between the hands-free and handheld modes. For example, in the hands-free mode, the sensor gain and exposure settings of the imager 111 are typically lower than in the handheld mode, illumination intensity from the illumination LED 119 is typically lower than in the handheld mode when the trigger 114 is activated, the imaging focal point is shorter (on variable focus designed readers) than in the handheld mode, a user feedback signal (e.g., light, sound effect, volume, etc.) is indicative of the hands-free mode and/or turns off upon decoding a target, with the handheld mode doing the inverse, a scene detect mode is activated to analyze a sampling of the imager 111 in order to detect an object passed in the field of view for the hands-free mode versus deactivating the scene detect mode, and/or the illumination LED 119 is automatically activated upon detection of an object passed in the field of view versus deactivating automatic activation in the handheld mode.

Alternatively or in addition, various other features can be altered between the hands-free mode and the handheld mode. For example, in the hands-free mode the aim intensity of the aiming LED 123 is lower or off as compared to the handheld mode. In another example, mechanical or magnetic retention mechanisms for retaining the reader 100 in place are activated for the hands-free mode and deactivated (or altered) for the handheld mode. In yet another example, the formatting or content of data transmitted to a remote host may vary depending on the mode (e.g., a different prefix or postfix, different communication format, etc.). In a further example, the virtual field of view within the image (i.e., the area of image that is actively processed) is wider in the hands-free mode than in the handheld mode. In still another example, the starting position within the image of the decode algorithm in the hands-free mode is left/right or random, and in the handheld mode the decode algorithm is centered. In still a further example, the laser scan angle on a laser designed reader is wider in the hands-free than for the handheld mode. In a yet further example, the power of the reader 100 is set higher for the hands-free mode than for the handheld mode until "woken up" upon touch.

In the handheld mode of operation, in response to actuation of the trigger 114, the controller 127 sends a command signal to energize the aiming LED 123, and to energize the illumination LED 119, for a short exposure time period, say 1080 microseconds or less, and energizes and exposes the imager 111 to collect the return light from the target 113 during said exposure time period. In the handheld mode, there is no constant attempt to illuminate, capture return light from, or process or decode, any target 113. In the handheld mode, most, if not all, of the components of the reader 100 are activated in response to actuation of the trigger 114.

Figure 6:
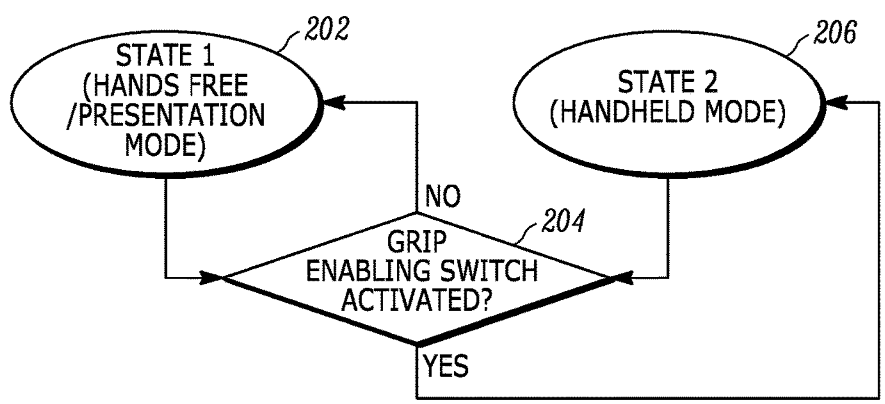
FIG. 6 is a flowchart of a method of controlling the optical imaging reader between a hands-free mode and a handheld mode in accordance with some embodiments.

FIG. 6 is a flowchart of the control of the imaging engine between a first state (hands-free or presentation mode) and a second state (handheld mode) in the embodiments that have been described herein. Turning now to the flowchart of FIG. 6, the imaging engine is in a first state 202 by default, which corresponds to a hands-free or presentation mode, in which the imaging engine is energized, the illuminating assembly is energized, and the controller 127 performs processing on the illuminated target 113, as described above. The controller 127 may continually monitor whether the grip-enabling switch 112 has been activated 204. If not, the imaging engine remains in the first state 202.

However, if the grip-enabling switch 112 has been actuated, the controller 127 switches the imaging engine to the second state 206, which corresponds to a handheld mode in which the aiming LED 123 may be energized in response to trigger/switch 114 actuation, the imaging engine may be energized in response to trigger 114 actuation, the illuminating LED 119 may be energized in response to trigger 114 actuation, and/or the controller 127 performs processing on the illuminated target 113 in response to trigger 114 actuation, as described above. Thereafter, the controller 127 continually monitors whether grip-enabling switch 112 remains actuated. If grip-enabling switch 112 is no longer actuated, the controller 127 switches to the first state 202.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An apparatus comprising:

a housing having a window and a manually-actuatable switch;

an imaging engine operable in a first state and a second state, the imaging engine supported by the housing and including a light-detecting sensor with a field of view extending through the window, the light-detecting sensor adapted to capture at least one of: light reflected from a target and light emitted from the target;

a grip-enabling switch supported by the housing and configured to be engaged by a purlicue of a hand of a user of the apparatus; and a controller operatively coupled to the grip-enabling switch and the imaging engine, the controller adapted to enable the imaging engine to operate in a first state without manually actuating the manually-actuatable switch and to enable the imaging engine to operate in a second state by manually actuating the manually-actuatable switch, and adapted to switch the imaging engine from the first state to the second state in response to actuation of the grip-enabling switch.

2. The apparatus of claim 1, wherein the grip-enabling switch comprises one of: a button switch and a trigger switch.

3. The apparatus of claim 1, wherein the controller is adapted to maintain the second state in response to continuous grip from a user on the grip-enabling switch.

4. The apparatus of claim 3, wherein the controller is adapted to switch the imaging engine from the second state to the first state in response to a release of the grip-enabling switch from the user.

5. The apparatus of claim 1, further comprising a transmitter/receiver pair supported within the housing, wherein the transmitter is adapted to transmit a signal and the receiver is adapted to receive the signal transmitted by the transmitter, and wherein the grip-enabled switch is adapted to interrupt the transmission of the signal to the receiver when the grip-enabled switch is actuated.

6. The apparatus of claim 5, wherein the grip-enabled switch comprises a main body, a proximal end and a distal end, wherein the proximal end is pivotally attached to the housing and the distal end is adapted to interrupt the transmission of the signal to the receiver when the grip-enabled switch is actuated.

7. The apparatus of claim 6, wherein the distal end comprises a structural extension orthogonal to the main body, and wherein the structural extension is adapted to interrupt the transmission of the signal to the receiver when the grip-enabled switch is actuated.

8. The apparatus of claim 6, wherein the grip-enabled switch comprises a spring bias between the grip-enabled switch and the housing, and adapted to maintain the grip-enabled switch in an un-actuated, extended position.

9. The apparatus of claim 7, wherein the spring bias is adapted to enable the grip-enabled switch to move from the un-actuated, extended position to an actuated, compressed position in response to a force in the range of 100 and 200 grams applied to the grip-enabled switch.

10. The apparatus of claim 5, wherein the transmitter/receiver pair comprises an optical emitter/receiver pair.

11. The apparatus of claim 1, wherein the grip-enabled switch is supported by the housing at least partially outside the housing, and wherein the manually-actuatable switch is supported by the housing at least partially outside the housing opposite the grip-enabled switch.

12. The apparatus of claim 1, wherein the imaging engine further includes an illumination system adapted to emit light to the target through the window, and wherein the controller is adapted to control the imaging engine in the second state to increase the brightness of the light emitted by the illumination system when the manually-actuatable switch is actuated as compared to the brightness of the light emitted by the illumination system in the first state.

13. The apparatus of claim 1, wherein the controller is adapted to control the imaging engine in the second state to have a first maximum working distance and to control the imaging engine in the first state to have a second minimum working distance.

14. An apparatus comprising:

a housing having a scanning head with a window, a handle, and a manually-actuatable switch supported by the handle;

an imaging engine supported by the scanning head and comprising a light-detecting sensor with a field of view extending through the window, the light-detecting sensor adapted to capture at least one of: light reflected from a target and light emitted from the target;

a grip-enabling switch supported by the handle and configured to be engaged by a purlicue of a hand of a user of the apparatus; and a controller operatively supported by the handle and operatively coupled to the manually-actuatable switch, the grip-enabling switch, and the imaging engine, the controller adapted to switch the imaging engine from a first mode to a second mode in response to actuation of the grip-enabling switch.

15. The apparatus of claim 14, wherein the handle comprises a distal end and a proximal end, wherein the scanning head comprises an anterior end and a posterior end, wherein the proximal end of the handle is connected to the posterior end of the scanning head, and wherein the grip-enabled switch is supported by the proximal end of the handle below the posterior end of the scanning head.

16. The apparatus of claim 14, wherein the controller is adapted to maintain the second mode in response to continuous grip from a user on the grip-enabling switch.

17. The apparatus of claim 14, wherein the controller is adapted to switch the imaging engine from the second mode to the first mode response to a release of the grip-enabling switch from the user.

18. The apparatus of claim 14, further comprising a transmitter/receiver pair supported within the housing, wherein the transmitter is adapted to transmit a signal and the receiver is adapted to receive the signal transmitted by the transmitter, and wherein the grip-enabled switch is adapted to interrupt the transmission of the signal to the receiver when the grip-enabled switch is actuated, and wherein the controller switches the imaging engine.

19. The apparatus of claim 18, wherein the transmitter/receiver pair comprises an optical emitter/receiver pair.

20. The apparatus of claim 14, wherein the imaging engine further includes an illumination system adapted to emit light to the target through the window, and wherein the controller is adapted to: enable the imaging engine in the first mode to emit light with a first characteristic without manually actuating the trigger, enable the imaging engine in the second mode to emit light with the first characteristic in response to manually actuating the trigger, and enable the imaging engine in the second mode to emit light with a second characteristic in response to not manually actuating the trigger.

21. The apparatus of claim 14, wherein the first mode comprises a presentation mode in which a user does not hold the handle, and the second mode comprises a handheld mode in which the user holds the handle.

* * * * *